US012559145B2

(12) United States Patent
Meierhoefer et al.

(10) Patent No.: US 12,559,145 B2
(45) Date of Patent: Feb. 24, 2026

(54) DEVICE FOR SUPPLYING ENERGY TO A SENSOR ARRANGEMENT IN A RAIL VEHICLE

(71) Applicant: Siemens Mobility GmbH, Munich (DE)

(72) Inventors: Franz Meierhoefer, Kirchensittenbach (DE); Simon Matthias Wokusch, Erlangen (DE); Juergen Goetz, Hoechstadt/Aisch (DE)

(73) Assignee: Siemens Mobility GmbH, Munich (DE)

( * ) Notice: Subject to any disclaimer, the term of this patent is extended or adjusted under 35 U.S.C. 154(b) by 877 days.

(21) Appl. No.: 17/854,253

(22) Filed: Jun. 30, 2022

(65) Prior Publication Data

US 2023/0001960 A1      Jan. 5, 2023

(30) Foreign Application Priority Data

Jun. 30, 2021    (DE) ..................... 10 2021 206 825.1

(51) Int. Cl.
  B61C 3/00         (2006.01)
  B61C 17/00        (2006.01)
     (Continued)

(52) U.S. Cl.
  CPC ............... B61C 3/00 (2013.01); B61C 17/00 (2013.01); H02J 7/02 (2013.01); H02J 50/10 (2016.02);
     (Continued)

(58) Field of Classification Search
  CPC .. B61C 3/00; B61C 17/00; H02J 50/10; H02J 7/02; H02J 2207/20; H02K 11/0094
  See application file for complete search history.

(56) References Cited

U.S. PATENT DOCUMENTS

2010/0253318 A1    10/2010  Thomas, Sr.
2012/0203481 A1     8/2012  Carpenter et al.
          (Continued)

FOREIGN PATENT DOCUMENTS

DE      102014106816 A9    2/2016
JP        2003072484 A     3/2003
          (Continued)

*Primary Examiner* — Robert J McCarry, Jr.
(74) *Attorney, Agent, or Firm* — Laurence A. Greenberg; Werner H. Stemer; Ralph E. Locher

(57)         ABSTRACT

A device supplies energy to a sensor arrangement in a rail vehicle. The device has a housing in which there is arranged a coil which can be inductively coupled to a motor cable carrying an alternating current. The housing is embodied to enclose part of a length of the motor cable, and the coil is wound around an annular coil core which concentrically or substantially concentrically surrounds the motor cable. The housing has multiple parts including at least one first and one second housing part. The annular coil core is implemented in multiple parts and a first coil core part is arranged in the first housing part and a second coil core part is arranged in the second housing part. The housing is further embodied to mechanically secure the motor cable to a component of the rail vehicle and/or to mechanically connect the motor cable to a further motor cable.

11 Claims, 10 Drawing Sheets

(51) Int. Cl.
    *H02J 7/02*             (2016.01)
    *H02J 50/10*           (2016.01)
    *H02K 11/00*           (2016.01)

(52) U.S. Cl.
    CPC ...... *H02K 11/0094* (2013.01); *H02J 2207/20*
                                (2020.01)

(56)                   References Cited

U.S. PATENT DOCUMENTS

2016/0005534 A1 *   1/2016   Koo ..................... H02J 7/0068
                                          361/139
2022/0032776 A1     2/2022   Koerner et al.

FOREIGN PATENT DOCUMENTS

JP           5149256 B2    2/2013
JP        2019124515 A    7/2019
KR      20100043834 A    4/2010
WO   WO 2020064274 A1    4/2020

* cited by examiner

DEVICE FOR SUPPLYING ENERGY TO A SENSOR ARRANGEMENT IN A RAIL VEHICLE

CROSS-REFERENCE TO RELATED APPLICATION

This application claims the priority, under 35 U.S.C. § 119, of German Patent Application DE 10 2021 206 825.1, filed Jun. 30, 2021; the prior application is herewith incorporated by reference in its entirety.

FIELD AND BACKGROUND OF THE INVENTION

The invention relates to a device for supplying energy to a sensor arrangement in a rail vehicle. The invention further relates to a rail vehicle having at least one such device.

A device for supplying energy to a sensor arrangement in a rail vehicle is known from the international patent disclosure WO 2020/064274 A1, corresponding to U.S. patent publication No. 2022/0032776. In the device, a coil having an electrical conductor is arranged concentrically around a motor cable which connects a power inverter to a traction motor of the rail vehicle. By means of inductive coupling, an alternating voltage applied to the motor cable generates an alternating voltage in the coil which serves for supplying energy to the sensor arrangement. The sensor arrangement in this case contains at least one switching module, which is embodied for example as an integrated circuit and which serves in particular for acquiring, processing and storing signals or data of at least one sensor which is arranged in the vicinity of a vehicle component and is intended to detect a condition of the vehicle component or a part of the component. Such vehicle components monitored by means of sensors are for example a truck or bogie of the rail vehicle as well as traction motors and transmissions arranged in the bogie, wherein in particular a condition of components that are subject to wear and tear, such as wheelset, motor and transmission bearings, can be determined.

Space to accommodate a sensor arrangement along with its energy supply is limited in most situations, in particular in the region of a bogie of the rail vehicle. This poses a particular challenge when it comes to retrofitting a sensor arrangement in a rail vehicle or rail vehicle type which has not been prepared for such a retrofit.

SUMMARY OF THE INVENTION

The object of the present invention is therefore to enable a simple and space-saving installation of the energy supply for a sensor arrangement, in particular in the case of a retrofit.

This object is achieved by means of the features of the independent claims. Developments are disclosed in dependent claims in each case.

A first aspect of the invention relates to a device for supplying energy to a sensor arrangement in a rail vehicle, which device has a housing in which there is arranged at least one coil which can be inductively coupled to a motor cable carrying an alternating current, wherein the housing is embodied to enclose part of the length of the motor cable, and wherein the at least one coil is wound around an annular coil core which surrounds the motor cable concentrically or substantially concentrically. The housing is characterized in that it is implemented in multiple parts and has at least one first and one second housing part. The annular coil core is implemented in multiple parts and at least one first coil core part is arranged in the first housing part and at least one second coil core part is arranged in the second housing part, and the housing is further embodied to mechanically secure the motor cable to a component of the rail vehicle and/or to mechanically connect the motor cable to at least one further motor cable.

According to the international patent disclosure WO 2020/064274 A1 cited in the introduction, the device according to the invention serves to supply a sensor arrangement with electrical energy. In this case a sensor arrangement can be embodied as what is known as a sensor box which is arranged on the component or components of the rail vehicle that are to be monitored or in the immediate environment thereof. The sensor box has a closed housing in which there are arranged in particular a processing device for processing signals generated by sensors, a storage device for storing sensor signals and/or results of the processing, and a communication device for transferring the processed signals and/or the results of the processing to a further device of the rail vehicle. In particular, the processing device is embodied in this case as an integrated circuit, more particularly as a microprocessor, which requires a direct-current voltage in order to operate. The sensors may be arranged either likewise in the housing of the sensor box or outside of the housing and connected to the latter via suitable interfaces.

The electrical energy required for the operation of the sensor arrangement is obtained by an inductive coupling of one or more coils to a motor cable which connects a current converter to a traction motor of the rail vehicle and in which an alternating current flows at least intermittently as part of a three-phase current supplying at least one winding of the traction motor. Accordingly, the alternating current flowing between a current converter and a traction motor of the rail vehicle is additionally used to supply a sensor arrangement with electrical energy, as a result of which there is advantageously no requirement for an energy supply that is more complicated, for example due to the need to run additional electric cables to the sensor arrangement, or more maintenance-intensive, for example due to the use of non-rechargeable batteries. Windings of the coil are wound around an annular coil core which concentrically or substantially concentrically envelops the motor cable. Preferably, the coil core is in the shape of a hollow cylinder and is made from a magnetizable material such as iron or an iron compound in order to increase the inductance of the coil. A respective number of windings of the coil around the coil core as well as the number of coils themselves may be dimensioned as a function of the electrical energy required for the operation of the sensor arrangement.

Preferably, the housing has a parting plane between the housing parts which extends parallel or substantially parallel to an axis of the enclosed motor cable. In the same way, the coil core parts preferably also have a parting plane which extends parallel or substantially parallel to the axis of the motor cable, the parting plane of the coil core parts preferably being identical to the parting plane of the housing parts. Alternatively, however, the respective parting plane, viewed in the axial direction, may also extend at a specific angle to the axis of the motor cable or for example form a respective structure which corresponds to a toothing system in the sense of a spline. Furthermore, it is not necessary for the parting plane of the housing parts to correspond to the parting plane of the coil core parts. Rather, the latter, viewed in the radial direction, may also be arranged at an arbitrary angle to the first-mentioned parting plane, for example at a right angle, in which case, for example, the coil core parts are initially arranged around the motor cable and subsequently the housing parts or housing halves are arranged around the coil core, as a result of which the latter is mounted in a fixed position in the housing.

Particularly preferably, the coil and the coil core are arranged in a housing implemented in two parts and have an identical parting plane extending parallel to the axis of the motor cable. A respective division of housing and coil core into two in a plane parallel to the axis of the enclosed motor cable advantageously enables the device or the housing to be arranged in a simple manner on a motor cable already routed in a bogie of the rail vehicle without the cable needing to be detached for example from a junction box of the traction motor and passed through a cylindrical feedthrough of the housing, as the housing disclosed in the international patent disclosure WO 2020/064274 A1 would require.

The housing parts or housing halves in a two-part housing are embodied for example in such a way that in the assembled state they are joined together into a housing which, when viewed from the outside, is embodied as largely monolithic, wherein their internal faces or undersides facing each other lie flat adjacent to each other without gaps or interengage with each other and therefore completely enclose the motor cable over the entire partial length. Basically, however, the motor cable does not have to be completely enclosed by the housing over the entire partial length. Rather, it may suffice that there is no gap between the internal faces or undersides of the housing parts or housing halves in the assembled state only in the region of the housing in which the coil core is arranged, such that the coil core parts terminating flush with the respective underside likewise adjoin one another without a gap or seamlessly. Outside of this region, on the other hand, the internal faces or undersides may have a certain clearance relative to one another without this adversely affecting the functioning of the device.

For the purpose of routing the motor cable, the housing parts or housing halves have on their internal faces or undersides for example a respective groove, the shape of which is matched to the shape of the cross-section of the motor cable. Thus, the grooves in the case of a circular or largely circular motor cable cross-section for example are correspondingly embodied as semicircular or largely semicircular in each case, such that together they form a cylindrical or largely cylindrical feedthrough in the housing. Alternatively, the feedthrough can also have an elliptical or largely elliptical shape, for example. This groove shape or the cross-section produced thereby of the feedthrough formed by the grooves is for example uniform over the entire length of the housing in the case of a housing completely enclosing the partial length of the motor cable. Alternatively, however, the shape of the feedthrough in the region of the housing in which the coil core is arranged and the shape outside of this region may be embodied differently.

The cross-section of the feedthrough of the housing is chosen for example in such a way that even if a motor cable having a greatest possible diameter typically used for the application is arranged in the feedthrough, the housing parts or housing halves continue to lie seamlessly adjacent to one another in the region of the coil core. In order to prevent a movement of the motor cable within the feedthrough, which over the typical service life of a rail vehicle could lead to a possible damage of the motor cable, the motor cable is preferably clamped in the region of the feedthrough. In order to clamp the motor cable in place, assuming the joining together of the housing parts or housing halves is not already sufficient, one or more inserts made of an elastic synthetic material, for example an elastomer, can be additionally arranged in the feedthrough. Inserts of this type bridge any gap between the sheathing of the motor cable and the radial internal face of the feedthrough or the grooves and are additionally compressed when the housing halves are mated together. Preferably, the inserts completely or almost completely enclose the motor cable in order to ensure a centered arrangement of the motor cable inside the feedthrough.

Alternatively, to a uniform cross-section of the feedthrough of the housing that is dimensioned to fit a large cross-section of the motor cable, both the radii of the grooves and the diameter of the coil core can be dimensioned for example with regard to a specific cross-section of the motor cable around which the housing is arranged. This advantageously enables an optimal inductive coupling to be achieved while at the same time clamping the motor cable without or with added inserts of limited thickness.

According to the invention, the housing is further embodied to secure the motor cable mechanically to a component of the rail vehicle and/or to connect it to one or more further motor cables.

A rail vehicle traction motor embodied as a three-phase machine has one or more stator windings, the respective phases of which are fed by a current converter having a three-phase alternating current of variable voltage and frequency. Accordingly, depending on the number of windings of the traction motor and the number of traction motors arranged in a bogie of the rail vehicle, three or an integral multiple of three motor cables are routed to a respective traction motor in the region of the bogie.

Typically, retaining clamps in block form are used for routing said motor cables, as well as for securing them to components of the bogie, for example to the bogie frame, or of the rail vehicle, for example to the car body in the region of the bogie. Such retaining clamps, also referred to in technical circles as block clamps, are embodied in particular based on the German standard DIN 3015-2, published in January 1999, which relates to clamps in block form for cables with a diameter between 6 mm and 406 mm.

A block clamp for routing and securing three motor cables can accordingly comprise a clamp half pair having three feedthroughs, the clamp half pair being braced by means of two or more bolts, for example hexagonal or cylinder head bolts, and if necessary additionally fastened by means of the bolts to a component of the rail vehicle. In order to route three motor cables in each case to two traction motors, two such clamp half pairs may in this case for example also be combined or, as the case may be, arranged one above the other and braced and secured by means of common bolts, in which case the two adjacent center clamp halves can also be realized here as a single component having corresponding grooves for six motor cables in total.

The housing of the device according to the invention is preferably embodied to replace such a block clamp arranged in the region of a bogie or to take over its function in addition for at least one motor cable. If the block clamp serves to secure the motor cable or the plurality of motor cables to a component of the rail vehicle, the housing will have for example the same clearance of the fastening bolts as the block clamp that is to be replaced and uses correspondingly dimensioned fastening bolts. Already existing fastening points on a component can thus be used for securing the housing, thereby advantageously enabling an easy retrofit of the housing of the device at low cost and without the need for changes to the component. Preferably, the bolts which join the housing parts or housing halves together, or at least one of said bolts corresponding to the replaced block clamp, also serve for mechanically securing the housing to the component.

In line with the further possible function of a block clamp, the housing can alternatively thereto serve for mechanically connecting a plurality of motor cables already routed to the one or more traction motors in the region of the bogie to a further point on said cable run in order to provide them with an additional mechanical stabilization at the further point. At the same time, by connecting the housing to a plurality of motor cables, a virtually immovable arrangement of the housing can also be achieved owing to the greater rigidity resulting therefrom, in particular in the case of such a retrofit.

Where there is a plurality of motor cables that are to be mechanically secured or connected, it is not necessary for the housing to enclose all of these. Rather, the housing may enclose one of the plurality of motor cables exclusively, while the further motor cables are routed by means of one or more retaining clamps. In this case the further retaining clamps are embodied correspondingly for example as block clamps or as retaining clamps based on the German standard DIN 3016, in particular DIN 3016-1, published December 2018, or DIN 3016-2, published August 2020, and mechanically secured to the housing in a suitable manner.

Basically, it is not essential for the housing parts or housing halves of the housing to be embodied in each case as closed, but rather they can also be designed as largely open, in particular when only the coil core parts and the at least one coil are arranged in the housing. Preferably, the coil core parts and the at least one coil wound around these are in this case implemented as encapsulated, as a result of which they are already effectively protected against dust and humidity in particular. The housing thus serves primarily to provide the coil core and the at least one coil with additional mechanical protection against striking objects such as, for example, stones from track ballast thrown up from the track bed. Thus, the housing in the region of the coil core can be embodied for example similarly to a cage-like arrangement of struts around the coil core, which furthermore serve to provide an immovable mounting of the coil core parts together with the at least one coil, as well as a guide for the motor cable.

The housing or its parts are preferably made of a metal, for example an aluminum alloy, as a result of which they are durable and comparatively robust against environmental influences. Alternatively, however, they can also be manufactured from a plastic material, for example a polypropylene copolymer or a polyamide. Typically, known block clamps, in particular retaining clamps manufactured according to DIN 3015-2, are also made from the cited materials.

According to a first embodiment of the device, at least the housing part in which the at least one coil is arranged is accessible via at least one closable opening on a top side and/or front face.

According to this embodiment, at least the housing part or the housing half in which the at least one coil is arranged is implemented for example as completely closed and forms at least one sealed space. In such a space, protected against environmental influences for example according to protection rating IP67, a coil core part and the at least one coil can be arranged on the one hand, while on the other hand further electronic components can be arranged in the space or in a further space separate therefrom, which components serve for processing the electrical energy inductively generated in the at least one coil.

Accordingly, at least this housing part or housing half has for example a tub-shaped base body with a closed underside or an underside open only in the region of the coil core, as well as a groove as previously described for routing the motor cable. The openings on the underside in this case serve on the one hand to enable the respective ends of the coil core parts in the region of the parting plane between the housing parts or housing halves to be arranged directly adjacent to one another, and on the other hand to prevent the magnetic flux being shorted in particular in the case of a housing made from an electrically conductive material such as an aluminum alloy, for example.

Access to the space or spaces formed in the tub-shaped base body is provided by at least one opening on the top side and/or on at least one of the two front faces of the housing part or housing half. Such an opening is sealed for example by way of a correspondingly fitted cover which is releasably fastened to the base body by means of a number of bolts. To achieve the desired protection according to the protection rating IP67 cited by way of example, a seal made of a flexible material should be provided in addition between the cover and the base body.

The plurality of housing parts or the two housing halves of the housing may be embodied identically or largely identically, in particular when at least one respective coil and possibly further electronic components are arranged therein. In this case a sensor arrangement can be supplied by means of the plurality of coils, in which event one coil in one housing half may serve for example as a redundant supply in case the other coil fails. Equally, a plurality of sensor arrangements may also be supplied by means of the plurality of coils, a respective housing half or a respective housing part being assigned to one sensor arrangement, for example. Alternatively, it is also possible for just the one housing part or the one housing half in which at least one coil and possibly further electronic components are arranged to be embodied in such a way, while further housing parts or the further housing half are embodied as largely open in accordance with the foregoing description.

The electrical energy generated by coil core and coil or coils is transmitted to a sensor arrangement by means of electrical leads which are preferably combined bundled into one cable in order to protect them against environmental influences. Such a cable is routed for example through a feedthrough which is provided in an external wall and is appropriately sealed by providing suitable seals in order to guarantee the requisite protection rating. Alternatively, the electrical leads may also be terminated at a socket having at least a corresponding number of electrical terminals and being arranged in a feedthrough of an external wall. The socket can be connected to a compatibly embodied connector in which in turn electrical leads of the cable routed for example to the sensor arrangement are terminated. The housing parts or the two housing halves may also be electrically connected to one another in the same way. This makes sense in particular when coils and possibly further electronic components are arranged in a plurality of housing parts or in both housing halves and collectively and cooperatively serve to provide a sensor arrangement with electrical energy.

According to a further embodiment of the device, at least two coils are arranged in the housing, the at least two coils being wound around an identical coil core part or around different coil core parts.

A plurality of coils may be arranged at the coil core, in particular as a function of the electrical energy required for supplying the sensor arrangement, the electrical energy extractable from the motor cable by means of induction being limited or not increasing proportionally to the number of coils. The plurality of coils may in this case be wound around an identical coil core part or around different coil core parts and consequently be arranged in the same housing part or the same housing half or in different housing parts or housing halves. Similarly, electronic components positioned in each case downstream of a coil may be arranged in the same or in different housing parts or housing halves. Alternatively, providing a plurality of coils may also serve to ensure redundancy in order for example to guarantee a continued supply to the sensor arrangement in the event of failure of a coil or electronic components disposed downstream of said coil.

According to a further embodiment of the device, at least one first voltage converter, at least one DC intermediate circuit having at least one DC link capacitor and at least one second voltage converter are arranged in at least one of the housing parts or in a further housing. The first voltage converter is connected to the at least one coil on the input side and to the DC intermediate circuit on the output side. The first voltage converter is embodied to convert an alternating voltage of the at least one coil into a direct-current voltage of the DC intermediate circuit, and the second voltage converter being connected to the DC intermediate circuit on the input side and to the sensor arrangement on the output side. The second voltage converter is embodied to convert the direct-current voltage of the DC intermediate circuit into a feeder direct-current voltage.

In the case of a traction motor fed with a three-phase alternating current, control of the rotational speed and torque of the three-phase machine on the part of the feeding current converter is accomplished by an alternating current of variable frequency and voltage amplitude. Due to the variable voltage level of the alternating current flowing in the motor cable, the output voltage of the coil as well as its frequency also vary accordingly. In order to enable the sensor arrangement to be supplied with a constant direct-current voltage, the coil is connected to a first voltage converter which provides a constant or virtually constant output voltage for a DC intermediate circuit by actively controlling the switching of semiconductor switches. In this case the semiconductor switches are driven or, as the case may be, a constant output voltage of the first voltage converter is regulated based on a monitoring of the voltage of the DC intermediate circuit, the electrical energy required for supplying the electronic components of the controller being provided for example by the outputs of the second voltage converter. In order to smooth or reduce the ripple of the output voltage of the first voltage converter, there is provided in the DC intermediate circuit at least one DC link capacitor which is connected in parallel with the first voltage converter. Connected to the DC intermediate circuit on the input side is a second voltage converter which converts the direct-current voltage of the DC intermediate circuit into the constant direct-current voltage required for the operation of the sensor arrangement. The second voltage converter in this case converts a higher direct-current voltage present at the DC intermediate circuit for example into a direct-current voltage having a lower constant voltage level. The second voltage converter may be embodied in particular as a step-down converter, which converts a higher voltage level in a fixed ratio to a lower voltage level.

The voltage converter and the at least one DC link capacitor are preferably arranged in the same housing part or in the same housing half as the coil in order to connect these to one another electrically both easily and over a short path. Alternatively, however, all or parts of the components may be arranged in a different housing part or they may also be arranged in a further housing, in particular if no closed space in which the components may be arranged protected from environmental influences is provided in the housing part of the coil. Such a further housing is for example the housing of the sensor arrangement or the sensor box or a further housing which is arranged between the housing of the coil and the housing of the sensor arrangement. Such a further housing may be arranged in the bogie of the rail vehicle for example at a location which is exposed to less severe environmental influences, including less severe vibrations and thermal emissions originating from the bogie, compared to the location at which the housing of the coil is arranged.

According to an alternative embodiment of the device to the foregoing embodiment, there are arranged in at least one of the housing parts or in a further housing at least one first voltage converter, at least one DC intermediate circuit having at least one DC link capacitor, at least one third voltage converter, at least one energy storage arrangement, and at least one fourth voltage converter. The first voltage converter is connected to the at least one coil on the input side and to the DC intermediate circuit on the output side, and the first voltage converter being embodied to convert an alternating voltage of the at least one coil into a direct-current voltage of the DC intermediate circuit. The third voltage converter is connected to the DC intermediate circuit on the input side and to the energy storage arrangement on the output side, and the third voltage converter being embodied to convert the direct-current voltage of the DC intermediate circuit into a charging direct-current voltage for the energy storage arrangement. The fourth voltage converter is connected to the energy storage arrangement on the input side and to the sensor arrangement on the output side, and the fourth voltage converter being embodied to convert a direct-current voltage of the energy storage arrangement into a feeder direct-current voltage.

The third voltage converter connected to the DC intermediate circuit on the input side is embodied similarly to the second voltage converter described in the foregoing for example as a step-down converter, the output voltage of which is not however aligned to the feeder direct-current voltage or supply voltage of the sensor arrangement, but to a charging voltage for the energy storage arrangement, to which the third voltage converter is connected on the output side. A step-down converter having a fixed voltage conversion ratio is suitable for use in particular when the energy storage arrangement contains a number of capacitors connected in series or in parallel, in particular so-called supercapacitors, which are chargeable by means of a constant charging voltage. If, on the other hand, the energy storage arrangement comprises rechargeable batteries, in particular lithium-ion batteries, the third voltage converter is preferably embodied as a charge controller which converts the intermediate circuit voltage into a charging voltage suitable for charging the batteries. The electrical energy stored in the energy storage arrangement serves to supply the sensor arrangement with electrical energy at least during a period of operation of the rail vehicle and irrespective of whether electrical energy is inductively generated by means of the at least one coil or not.

The capacity of the energy storage arrangement is dependent on periods of time in which no electrical energy is generated on the part of the at least one coil or should be dimensioned as a function of the electrical energy typically required in said periods of time for the operation of the sensor arrangement. It can however be taken into account in this case that the functioning of the sensor arrangement usually only needs to be ensured during the normal operation of the rail vehicle, whereas, on the other hand, for periods of time in which the rail vehicle is powered down, i.e. taken out of service and parked up, no electrical energy needs to be held available in the energy storage arrangement. The storable amount of energy in the case of a multiple unit trainset in revenue service can be based for example on a maximum stopping time at stations or on a maximum duration of coasting phases on individual sections of track, between which the energy storage arrangement can be sufficiently charged again by means of inductively generated electrical energy.

According to this embodiment, a fourth voltage converter is provided in order to raise the output voltage of the energy storage arrangement to the level of the supply voltage of the sensor arrangement. The fourth voltage converter is embodied for example as a step-up converter, which converts a low voltage level in a fixed ratio to a constant higher voltage level. Both the second voltage converter of the foregoing alternative embodiment and the fourth voltage converter therefore provide the desired supply voltage for the sensor arrangement, such that a continuous supply for the sensor arrangement during the operation of the rail vehicle is ensured.

Preferably, all components of this embodiment are arranged in the same housing part or in the same housing half so that the housing part or the housing half can be directly connected to the sensor arrangement by means of a cable. According to the foregoing embodiment, however, all of these components or individual components thereof may equally be arranged in a different housing part or also in a further housing, in particular in the housing of the sensor arrangement.

According to an alternative embodiment of the device to the two foregoing embodiments, at least one first voltage converter, at least one DC intermediate circuit having a DC link capacitor, at least one second voltage converter, at least one third voltage converter, at least one energy storage arrangement, and at least one fourth voltage converter are arranged in at least one of the housing parts or in a further housing. The first voltage converter is connected to the at least one coil on the input side and to the DC intermediate circuit on the output side, and the first voltage converter being embodied to convert an alternating voltage of the at least one coil into a direct-current voltage of the DC intermediate circuit. The second voltage converter is connected to the DC intermediate circuit on the input side and to the sensor arrangement on the output side, and the second voltage converter being embodied to convert the direct-current voltage of the DC intermediate circuit into a feeder direct-current voltage. The third voltage converter is connected to the DC intermediate circuit on the input side and to the energy storage arrangement on the output side, and the third voltage converter being embodied to convert the direct-current voltage of the DC intermediate circuit into a charging direct-current voltage for the energy storage arrangement. The fourth voltage converter is connected to the energy storage arrangement on the input side and to the sensor arrangement on the output side, and the fourth voltage converter is embodied to convert a direct-current voltage of the energy storage arrangement into the feeder direct-current voltage.

This embodiment represents an advantageous combination of the two foregoing embodiments, wherein both the second voltage converter and the third voltage converter are connected to the DC intermediate circuit or are fed from the latter. In this case, during the time periods in which the at least one coil generates electrical energy, the sensor arrangement can be fed by the second voltage converter and also, if necessary, the energy storage arrangement can be charged via the third voltage converter, whereas in the times in which the at least one coil generates no electrical energy, the sensor arrangement is fed from the energy storage arrangement and the fourth voltage converter.

Second and fourth voltage converters can be electrically interconnected on the output side, for example, so that, if the cited components are not arranged in the housing of the sensor arrangement, a single electric cable must be run to the housing of the sensor arrangement in order to supply the latter. Once again, however, an arrangement of all or individual components of this embodiment in a different housing part or in a further housing, and in particular in the housing of the sensor arrangement, is possible.

According to a further embodiment of the device, a device for measuring a rotational speed and/or a device for detecting a current signature, which are connected to the coil, are also arranged in at least the housing part in which the at least one coil is arranged.

Such devices connected to the coil can in principle be assigned to the sensor arrangement or, in addition to sensors of the sensor arrangement, provide information relating to the condition or the operating state of a component of the rail vehicle. Thus, in a device for calculating a rotational speed from a frequency of the alternating voltage present at the coil, which corresponds to the frequency of the alternating voltage present at the motor cable, information is generated from which a current rotational speed of the traction motor can be determined. In this case the rotational speed can be determined, in particular taking into account the number of pole pairs of the traction motor, in the device itself or in a further device to which the information is supplied. Such a further device is for example the processing device of the sensor arrangement or a central drive controller of the rail vehicle. The information or the rotational speeds determined therefrom are transferred by the rotational speed measuring device to the processing device of the sensor arrangement for example via separate leads which are routed in a cable together with leads for the energy supply of the sensor arrangement. The information or the rotational speeds determined therefrom are transferred by the processing device for example together with further information via the communication device to further components, in particular to a central drive or vehicle controller of the rail vehicle. The rotational speeds determined in this way may serve instead of or in addition to rotational speeds determined for example by means of a known rotational speed sensor for controlling the drive or traction system of the rail vehicle.

A device for detecting a current signature, in contrast, serves to detect the frequency spectrum of the current flowing in the motor cable, i.e. of the motor current of a phase of the three-phase alternating current by means of which the stator winding of the traction motor is fed. In this case the frequency spectrum of the motor current is determined from measurements of a current flowing through the coil or of an alternating voltage present at the coil. From a subsequent analysis of the determined frequency spectrum of the motor current it is possible to identify additional frequency components on which the frequency components of the motor current are superimposed. A faulty or damaged component of the traction motor, for example a defective roller bearing in which the motor shaft is mounted, can be inferred from these additional frequency components. Such an analysis of a signal of the stator current is known by the term Motor Current Signature Analysis (MCSA). Advantageously, the signature analysis is suitable for detecting a defect in a component of the traction motor, as an alternative to vibration sensors, for example. Since the analysis of the frequency spectrum is computationally intensive, this is preferably not performed by the detection device arranged in the housing part, but for example by the processing device of the sensor arrangement or of a further central device of the rail vehicle. The current signals generated by the detection device are accordingly transmitted via separate leads in the cable routed to the sensor arrangement in order to be processed further in the latter and/or to be transferred by the latter to a central device by means of the communication device.

A second aspect of the invention relates to a rail vehicle which has at least one traction device which comprises at least one traction motor as well as a current converter feeding the at least one traction motor, current converter and traction motor being connected by means of a plurality of motor cables, and at least one sensor arrangement comprising a number of sensors which serve for detecting a condition of at least one component of the rail vehicle. The rail vehicle is further characterized by at least one device according to the invention for supplying the at least one sensor arrangement with electrical energy.

According to the foregoing description, the at least one traction motor is embodied for example as a three-phase machine having one or more stator windings, the respective three phases of which are fed with a three-phase alternating current of variable voltage and frequency by a current converter. Such a three-phase machine is an asynchronous or synchronous machine, for example. The traction motor is arranged for example in a bogie and drives, either directly or via a transmission, a wheelset mounted in the bogie and consisting of a wheelset axle and two wheels arranged thereon. A coupling can additionally be arranged between motor and wheelset axle or between motor and transmission or between transmission and wheelset axle in order in particular to enable the components to move relative to one another. Depending on the number of windings of the traction motor and the number of traction motors arranged in a bogie, three or an integral multiple of three motor cables are routed in the region of the bogie. Bogies having wheelsets mounted therein and at least partially driven wheelsets serve to support the rail vehicle on a track.

The at least one sensor arrangement can be arranged in the region of such a driven bogie, also referred to as a motor bogie, in order to detect its condition by means of a number of sensors arranged on the traction motor or transmission or in the immediate environment thereof. In this case the sensor arrangement is supplied with electrical energy by means of a device according to the invention arranged on a motor cable, the device securing the motor cable to a component of the rail vehicle and/or connecting the latter to at least one further motor cable. As already stated in the foregoing, the device according to the invention advantageously enables a simple retrofit of such a sensor arrangement at low cost, in particular in rail vehicles already in operational service.

According to an embodiment of the rail vehicle, a component to which the housing of the device can be fixed is a traction motor, a bogie or a car body of the rail vehicle.

Other features which are considered as characteristic for the invention are set forth in the appended claims.

Although the invention is illustrated and described herein as embodied in a device for supplying energy to a sensor arrangement in a rail vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
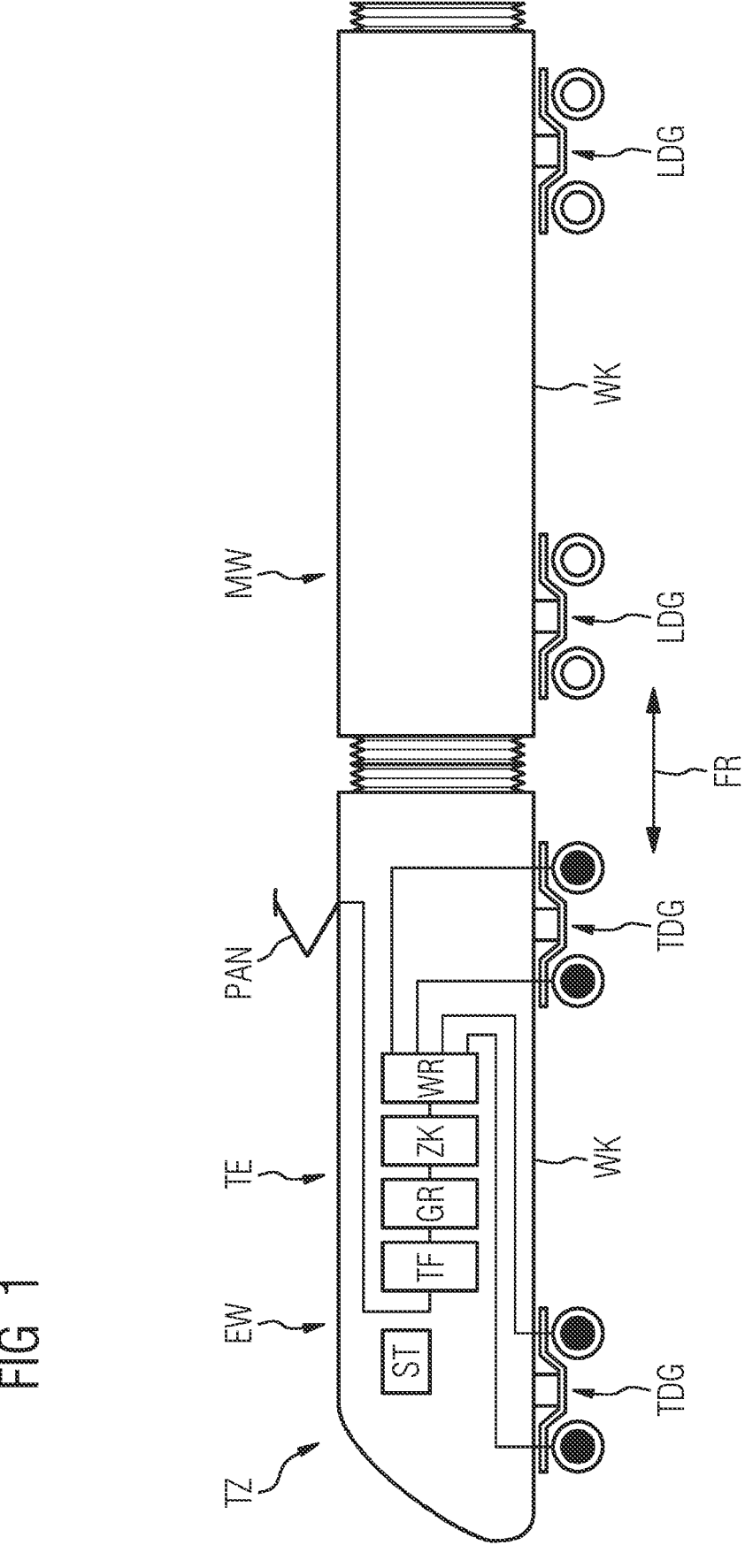
FIG. 1 is a diagrammatic, side view of a rail vehicle.

Referring now to the figures of the drawings in detail and first, particularly to FIG. 1 thereof, there is shown an exemplary rail vehicle in a side view. The rail vehicle illustrated by way of example is embodied as a multiple unit trainset TZ for passenger transportation containing a plurality of cars, only one tail car EW and an intermediate car MW coupled thereto being depicted. Both cars feature a car body WK with a respective passenger compartment which is supported on rails (not shown) by way of bogies in the form of motor bogies TDG or trailer bogies LDG. However, the rail vehicle may be realized in the same way as, for example, a locomotive having only one car body.

Components of the traction device TE of the electrically driven rail vehicle are indicated schematically in the tail car EW. Typically, these components are arranged in special areas within the car body, in the underfloor area, in the roof area or also distributed over a number of cars. Further components of the traction device TE, for example a traction battery, as well as auxiliary systems required for the operation of the components and also for the well-being of passengers, can be provided in addition, but are not specifically shown in FIG. 1.

The traction device TE can be electrically connected via a pantograph PAN arranged in the roof area of the tail car EW to an overhead contact wire (not shown) of a railroad traction power network, the overhead contact wire in the example carrying a single-phase alternating current. The alternating current is supplied to a grid-side primary winding of a transformer TF in which the grid-side voltage level of, for example 15 kV or 25 kV, is transformed down to a lower voltage level. A secondary winding of the transformer TF is connected to a grid-side current converter, for example a rectifier GR or four-quadrant chopper, which rectifies the applied alternating voltage. The grid-side current converter GR feeds a direct-current voltage intermediate circuit ZK, which in turn feeds a load-side current converter WR, for example an inverter or pulse inverter. From the direct-current voltage, the pulse inverter generates for example a three-phase alternating voltage having variable frequency and amplitude, by means of which three-phase stator windings of traction motors in the traction bogies TDG are fed. The operation in particular of the grid-side GR and the load-side current converter WR is controlled in the known manner by a control device ST.

Alternatively, or in addition, the rail vehicle TZ can also be electrically connected to an overhead contact wire or a conductor rail which carries a direct current at a voltage level of, for example, 3 kV or 1.5 kV via a corresponding pantograph. In this case the DC intermediate circuit ZK of the traction device TE of the rail vehicle TZ can be fed directly or via a direct-current voltage converter.

Figure 2:
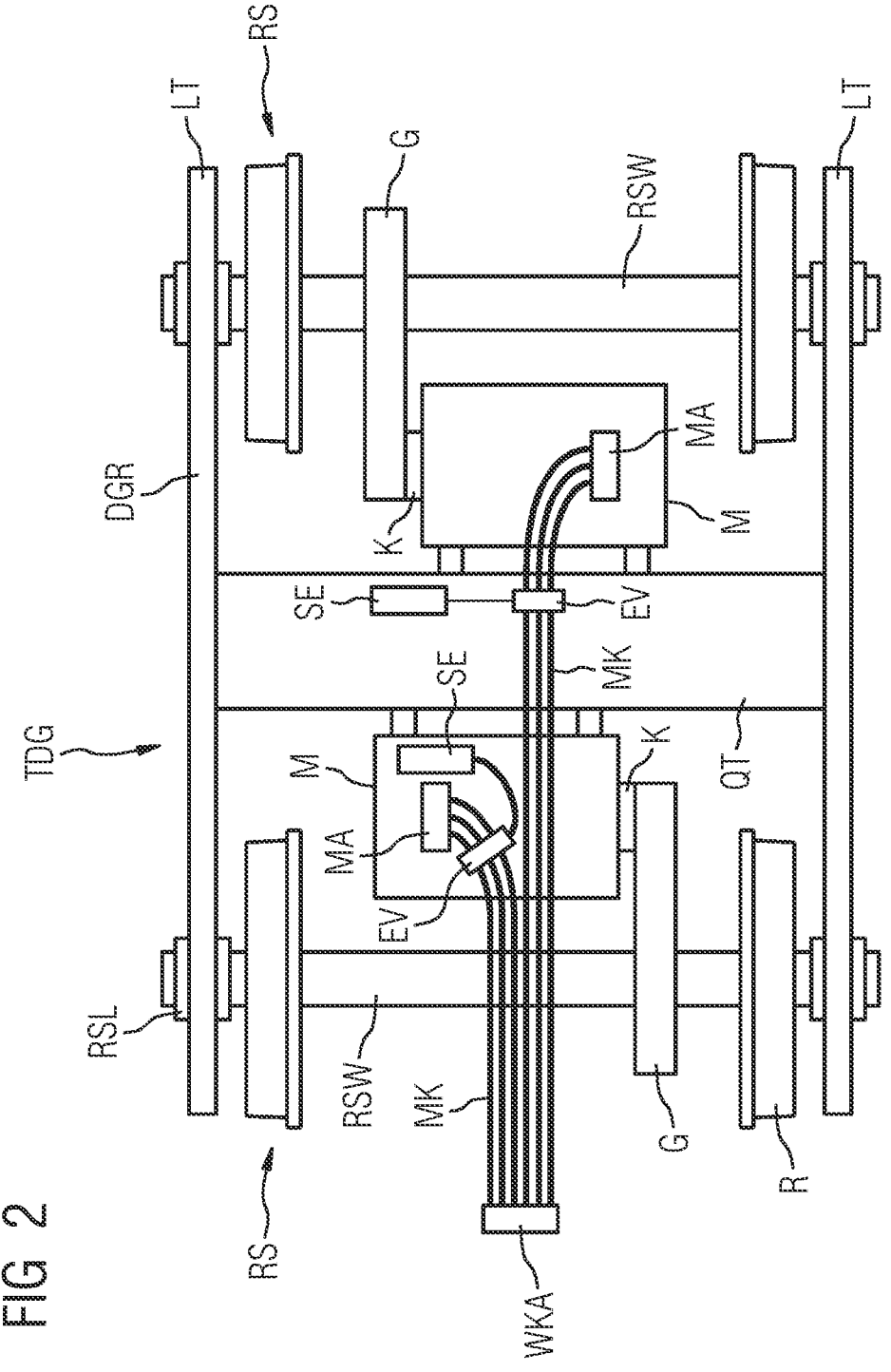
FIG. 2 is a diagrammatic, top view of a motor bogie having devices and sensor arrangements according to the invention.

FIG. 2 schematically shows a motor bogie TDG, as arranged by way of example on the tail car EW of the multiple unit trainset TZ of FIG. 1. The motor bogie TDG contains by way of example a bogie frame DGR which consists of a central crossmember QT and two longitudinal side members LT arranged thereon, the crossmember QT additionally serving to connect the motor bogie TDG mechanically in a rotatable and spring-mounted manner to the car body WK of the tail car EW. Two wheelsets RS are arranged on the longitudinal side members LT, each wheelset RS consisting of a wheelset axle RSW and two wheels R connected thereto in a torsionally rigid manner. Each of the wheelset axles RSW is rotatably mounted in wheelset bearings RSL on the longitudinal side members LT. By way of example, two traction motors M are mounted on the crossmember QT of the bogie frame DGR. The motor shaft of the respective traction motor M is connected to the rotor of the three-phase machine and linked via a coupling K to the input shaft of a transmission G. The wheelset axle RSW, in contrast, represents an output shaft of the transmission G. The two traction motors M are embodied as three-phase machines whose three phases of the stator winding are connected via three motor cables MK to the inverter WR of the traction device TE arranged outside of the motor bogie TDG. The motor cables MK are connected to the stator winding via motor terminals MA on the respective traction motor M on the one hand, and terminated by way of example at car body terminals WKA on the other hand.

Two energy supply devices EV and sensor arrangements SE connected to these are arranged in the motor bogie TDG. The different locations for installing the energy supply devices EV and the sensor arrangements SE serve in this case as an exemplary illustration of the advantageous flexibility which in particular allows a subsequent installation of sensor arrangements in motor bogies TDG already in operational service. Thus, one of the energy supply devices EV and the sensor arrangement SE supplied by it are arranged by way of example in the region of the left-hand traction motor M. This sensor arrangement SE is in this case fixed to the housing of the left-hand traction motor M, whereas the energy supply device EV is arranged in the region of the motor terminals MA of the traction motor M and, in a similar manner to a block clamp, mechanically connects the three motor cables MK to one another, the energy supply device EV itself not being fixed to the housing of the traction motor M. The other of the energy supply devices EV, in contrast, is, like the sensor arrangement SE supplied by it, secured by way of example to the crossmember QT of the bogie frame DGR, the energy supply device EV, likewise in a similar manner to a block clamp, serving to secure or guide the three motor cables MK to the motor terminals MA of the right-hand traction motor M.

The sensor arrangements SE contain a respective number of sensors, though these are not depicted specifically. These sensors serve by way of example for detecting the condition of the components arranged in the motor bogie, in particular the traction motors, the couplings, the transmissions and the wheelset bearings. Depending on the configuration of the sensor arrangement SE, the sensors can be disposed in the housing of the sensor arrangement SE or arranged on the components that are to be monitored and can be connected to the sensor arrangement SE via suitable leads.

Figure 3:
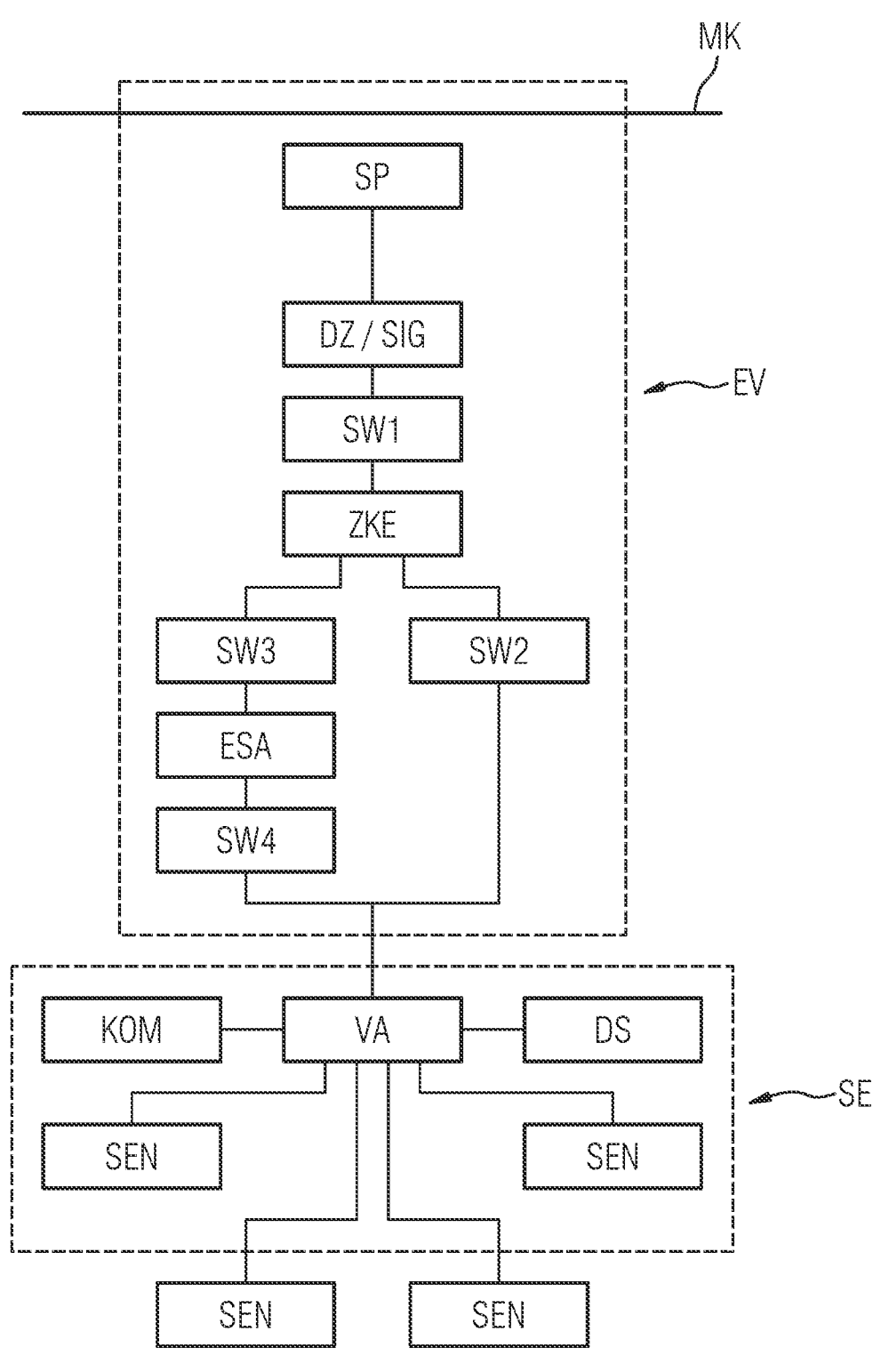
FIG. 3 is a block diagram of components of the device according to the invention and of the sensor arrangement.
Figure 4:
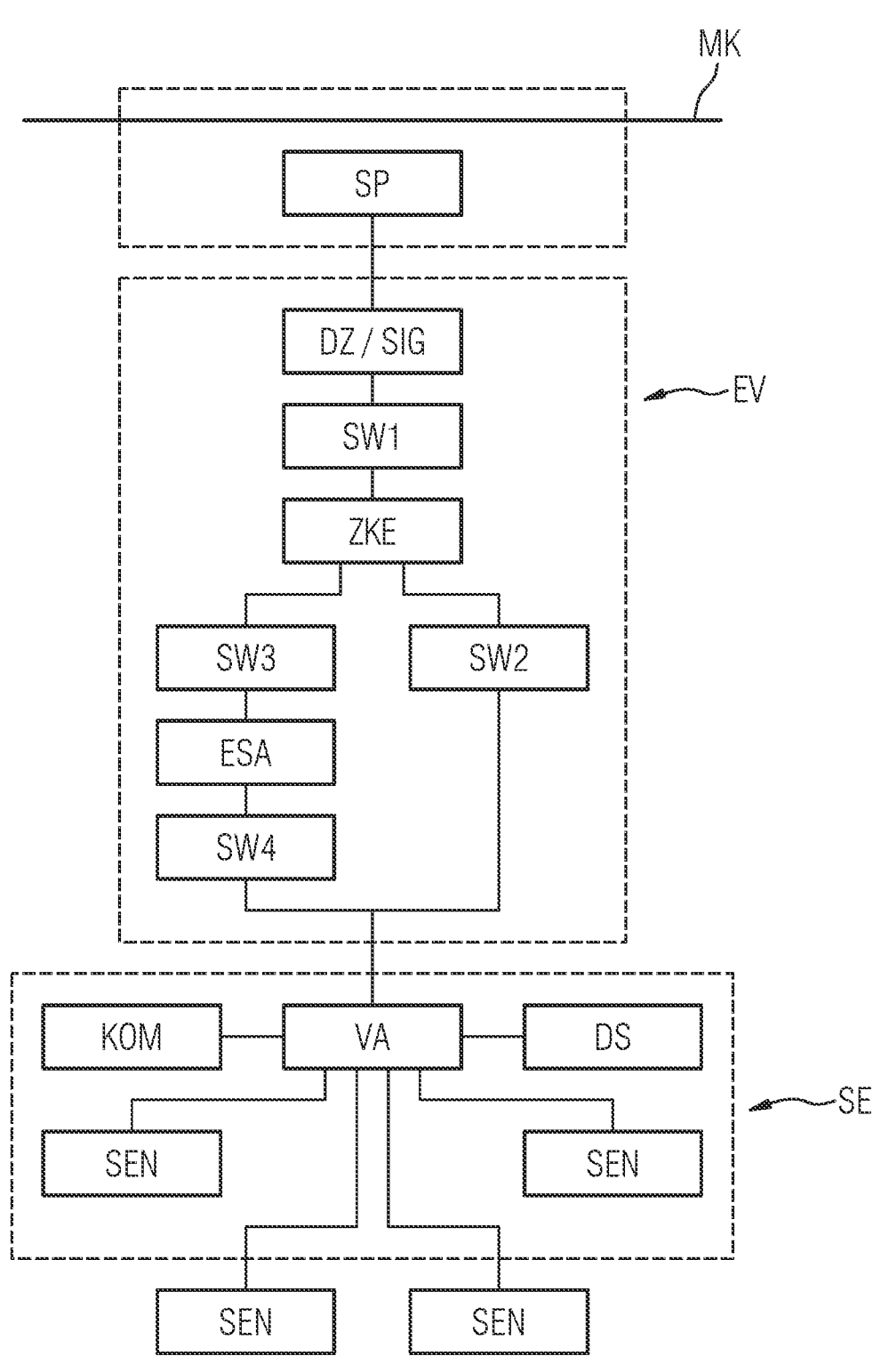
FIG. 4 is a block diagram with an alternative arrangement of the components in multiple housings.
Figure 5:
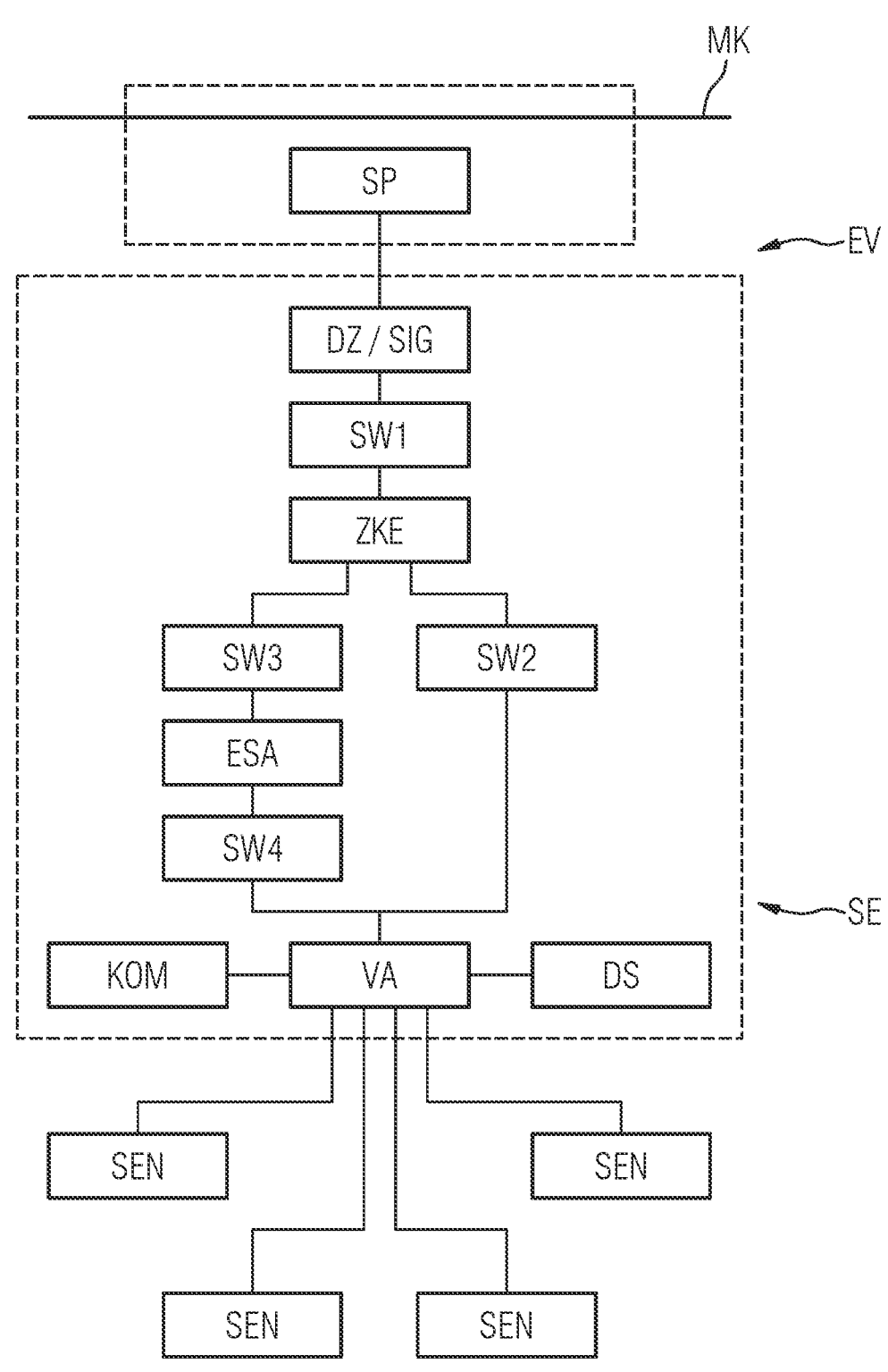
FIG. 5 is a block diagram with a further alternative arrangement of components in multiple housings.

FIGS. 3 to 5 show examples of block diagrams of the energy supply device EV and the sensor arrangement SE. The electrical and electronic components arranged in a housing or in the plurality of housings of the energy supply device EV as well as in the housing of the sensor arrangement SE are depicted therein, a housing being schematically represented in each case by a dashed line.

In the energy supply device EV, a coil SP is inductively coupled to a motor cable MK in which an alternating current having variable voltage level and variable frequency flows at least intermittently. The coil SP can be connected to a device for measuring a rotational speed DZ and/or detecting a current signature SIG whose data is transmitted by means of a lead (not shown specifically) to the sensor arrangement SE. The coil SP is further connected to a first voltage converter SW1, in particular an actively controlled rectifier, which converts the alternating current generated inductively in the coil SP at likewise variable voltage level and variable frequency into a direct current having a maximally constant voltage level. On the output side, the first voltage converter SW feeds a DC intermediate circuit ZKE in which there is arranged at least one DC link capacitor, which serves to reduce the voltage ripple.

The DC intermediate circuit ZKE in turn feeds on the one hand a second voltage converter SW2, which is embodied as a step-down converter, and converts the direct-current voltage present at the DC intermediate circuit ZKE into a constant direct-current voltage of, for example, 5V. This constant direct-current voltage serves to supply the sensor arrangement SE or the components arranged therein, which are explained in more detail below. The DC intermediate circuit ZKE further feeds a third voltage converter SW3, which is likewise embodied as a step-down converter and which converts the direct-current voltage applied at the DC intermediate circuit ZKE into a direct-current voltage of, for example, 2.4V, by means of which an energy storage arrangement ESA can be charged. The energy storage arrangement ESA in this case comprises a number of energy storage devices, for example capacitors or rechargeable batteries. The voltage of the energy storage arrangement ESA or of the energy storage devices is in turn converted by means of a fourth voltage converter SW4 to a direct-current voltage of 5V. At the same time the energy storage arrangement ESA enables the sensor arrangement SE to be supplied with electrical energy also in periods of time in which no current flows in the motor cable and consequently the coil SP generates no energy which can be supplied to the sensor arrangement SE via the second voltage converter SW2.

Disposed in the sensor arrangement SE is a processing device VA which is able to process data and signals from different sensors SEN mounted in and outside of the housing of the sensor arrangement SE, as well as from the rotational speed measuring device DZ and/or the current signature detection device SIG in the energy supply device EV. The processing device VA is embodied for example as one or more microprocessors and is connected to a data storage device DS. The processing device VA is further connected to a communication device KOM by means of which data generated by the processing device VA is transferred via a radio interface to a further device in the rail vehicle TZ, for example to the central control device ST, in which the data is processed further and evaluated. The sensors SEN arranged inside and/or outside the housing of the sensor arrangement SE comprise for example temperature sensors, acceleration sensors or also vibration sensors.

Figure 6:
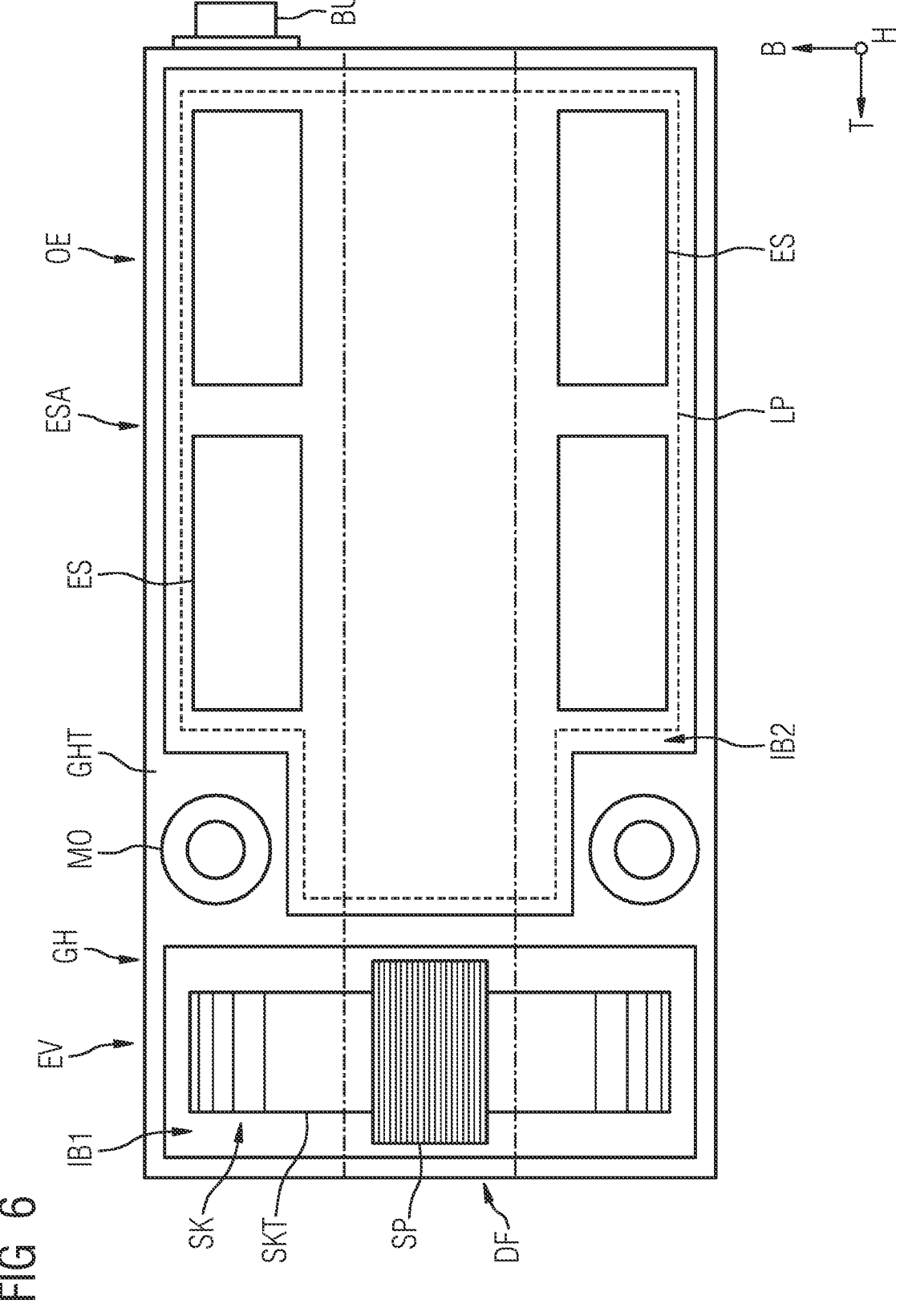
FIG. 6 is a plan view of a first example of the device according to the invention.
Figure 7:
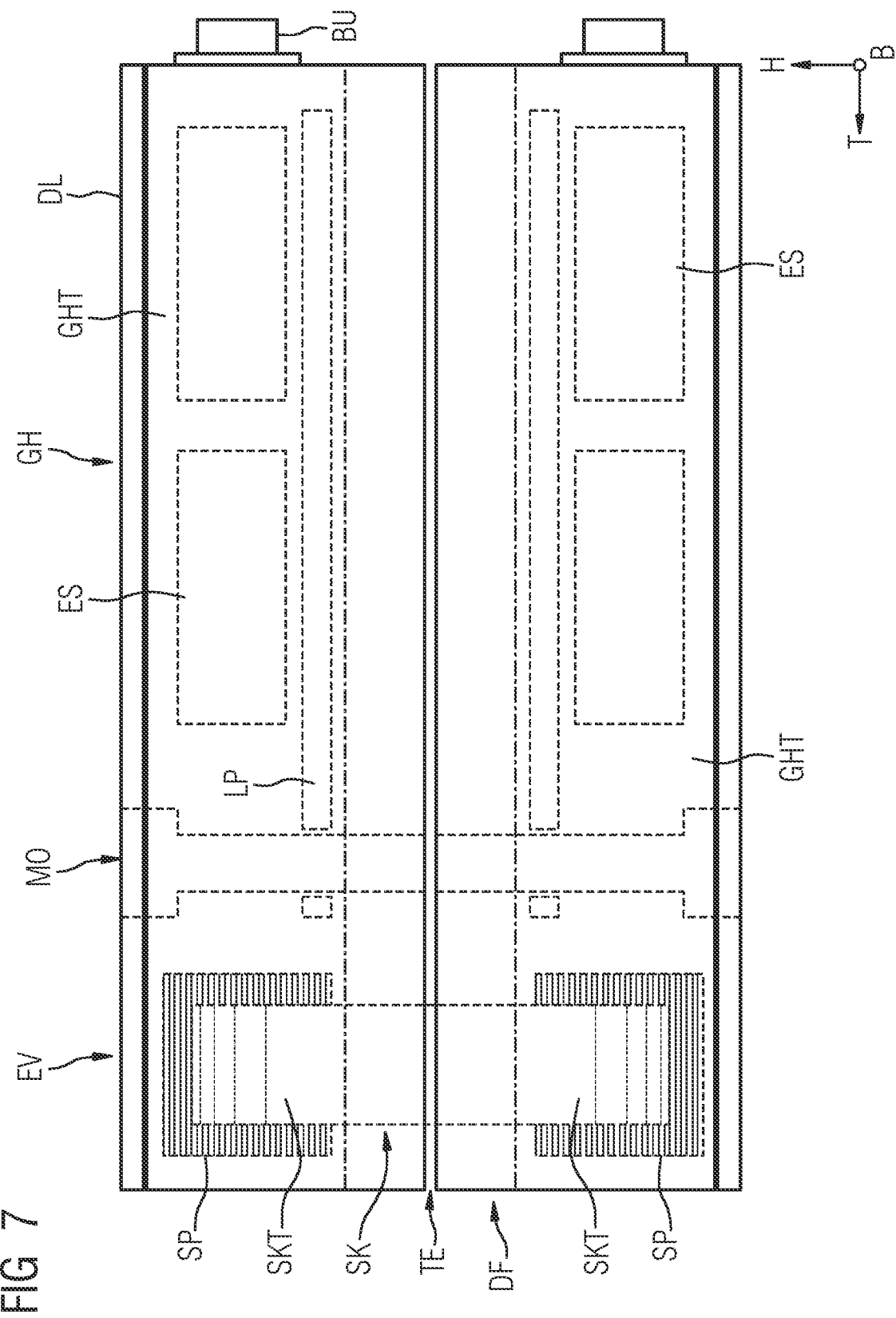
FIG. 7 is a side view of the device of the first example.
Figure 8:
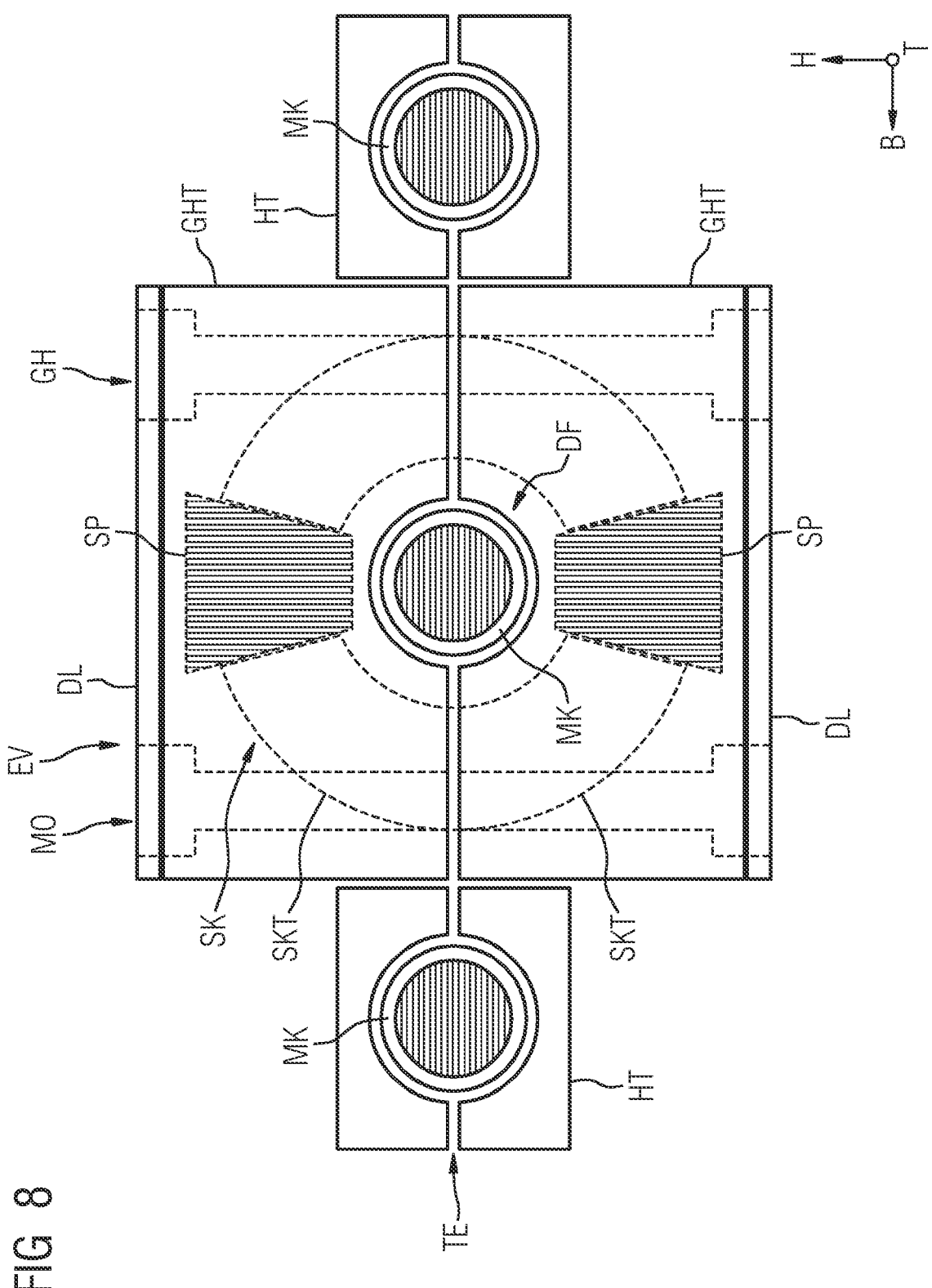
FIG. 8 is a front view of the device of the first example with added retainers for further motor cables.

FIGS. 6 to 8 schematically show the layout of the energy supply device EV according to a first example from different perspectives. The energy supply device EV contains a housing GH consisting of two housing halves GHT which can be mechanically joined to each other and in or between which a motor cable MK can be arranged. FIG. 6 shows herein an upper housing half GHT of the housing GH in a plan view, while a removed cover, which otherwise protects the housing half GHT or the components arranged therein against environmental influences, affords a view into the interior of the housing half GHT. The two housing halves GHT as well as the respective covers DL are produced for example by means of a die casting method from an aluminum material and are generally embodied in a tub shape. The interior of the housing half GHT is by way of example subdivided into two sections, a coil core part SKT being arranged in a left-hand first interior section IB1, around which coil core part SKT a coil SP is wound. The first interior section IB1 is separated from a right-hand second interior section IB2 by a housing wall.

Disposed in the second interior section IB2 is a printed circuit board LP on which electrical and electronic components which realize in particular the functions of the described voltage converters SW1 to SW4 are arranged. Alternatively, if necessary, several printed circuit boards LP, arranged stacked one above the other for example, may also be provided. Further, a plurality of energy storage devices ES of an energy storage arrangement ESA, for example in the form of a respective capacitor or a respective rechargeable battery, are arranged in particular in the peripheral areas of the second interior section IB1. The printed circuit board LP is connected to terminals of a socket BU arranged on the right-hand housing wall of the housing half GHH, to which socket BU an electric cable with a corresponding connector can be connected. Alternatively to a connection to a socket, such a cable can also be routed via a suitably sealed opening into the interior of the housing half GHT and there be connected for example to electrical terminals on the printed circuit board LP.

Assembly openings MO which extend through the entire height H of the housing half GHT or of the housing GH are provided in the area between the first IB1 and second interior section IB2. The assembly openings MO serve to receive for example hexagonal or cylinder head bolts by means of which the two housing halves GHT are braced and also, if necessary, additionally fixed to a component of the rail vehicle. Preferably, the assembly openings MO are spaced apart from one another in the direction of the width B, which spacing corresponds to an equivalent spacing of a block clamp that is to be replaced by the energy supply device EV.

A feedthrough DF, in which a motor cable MK can be arranged, extends centrally through the housing half GHT or through the housing GH and across the entire depth of the housing GH. The feedthrough DF or its greatest width is indicated by way of example by dash-dotted lines. As additionally illustrated in FIG. 8, the feedthrough DF is preferably embodied as cylindrical or largely cylindrical to allow a motor cable MK having a circular or virtually circular cross-section to be arranged and secured therein. A motor cable MK contains in a known manner one or more leads, preferably made of a copper material, as well as a sheathing made of an electrically insulating plastic material.

FIG. 7 schematically shows a side view of the two housing halves GHT, arranged one above the other, which together form the housing GH of the energy supply device EV. In this case the housing halves GHT are shown in a state in which they have not yet been joined together but are still separated from each other by a small clearance in the vicinity of a parting plane TE at which the undersides of the housing halves GHT face each other. After the housing halves GHT have been joined together, for example by bracing or fastening to a component, at least the cross-sectional surfaces of the coil core parts SKT should directly adjoin each other. The parting plane TE extends by way of example parallel or largely parallel to a main axis of the motor cable MK arranged in the feedthrough DF. With the joining together of the two housing halves GHT, the motor cable MK is additionally clamped inside the feedthrough in order to prevent movements of the motor cable MK in the feedthrough DF or at least in its end areas and consequently avoid possible damage to the cable sheathing.

It is clear from the diagram that the two housing halves GHT can essentially be embodied identically or can have a symmetrical structure. In particular when only a small amount of electrical energy is required for the operation of the sensor arrangement SE, arranging a coil and the further components in one of the housing halves GHT may however already be sufficient, while only the other coil core part SKT is arranged in the other housing half GHT in order to form a complete coil core SK. In the embodiment shown in FIG. 7, with coils SP and further components in both housing halves GHT, these may therefore supply for example a single sensor arrangement or also two mutually independent sensor arrangements in parallel, wherein in the latter case a respective electric cable is routed from one housing half GHT or its socket BU to the respective sensor arrangement.

As is also apparent from the diagram, the printed circuit boards LP and respective energy storage devices ES are in each case arranged above the feedthrough DF extending through the entire depth T of the housing GH. Provided the remaining space to the side of the feedthrough DF, i.e. in the direction of the width B of the housing GH, allows, further energy storage devices ES may be arranged for example in these areas in order to increase the storage capacity of the energy storage arrangement ESA.

FIG. 8 shows a front view of the housing GH or of the two housing halves GHT. As is also evident from this diagram, as a result of groove-shaped embodiments of their opposing undersides, the two housing halves GHT form a cylindrical or largely cylindrical feedthrough DF which concentrically encloses a motor cable MK. The housing halves GHT are in this case brought together so closely in the region of the parting plane TE that the coil core parts SKT together form a closed coil core SK. The two coils SP are each arranged in the upper section of the coil core SK in the direction of the height H, though these can also be arranged in the same way at another suitable point of the circumference of the coil core part SKT in the housing half GHT, as shown by way of example in FIG. 9. Furthermore, as likewise shown by way of example in FIG. 9, a plurality of coils SP may also be arranged in a housing half GHT or at a coil core part SKT, for example in order to increase the electrical energy inductively generated by means of the coils.

FIG. 8 shows further that additional retainers HT are provided by way of example to the sides of the housing halves GHT, by means of which retainers the two further motor cables MK routed to the traction motor M are secured or guided accordingly to the housing GH. The retainers HT are for example bolted to the housing halves GHT, but may also be embodied as integral parts of the housing halves GHT.

Figure 9:
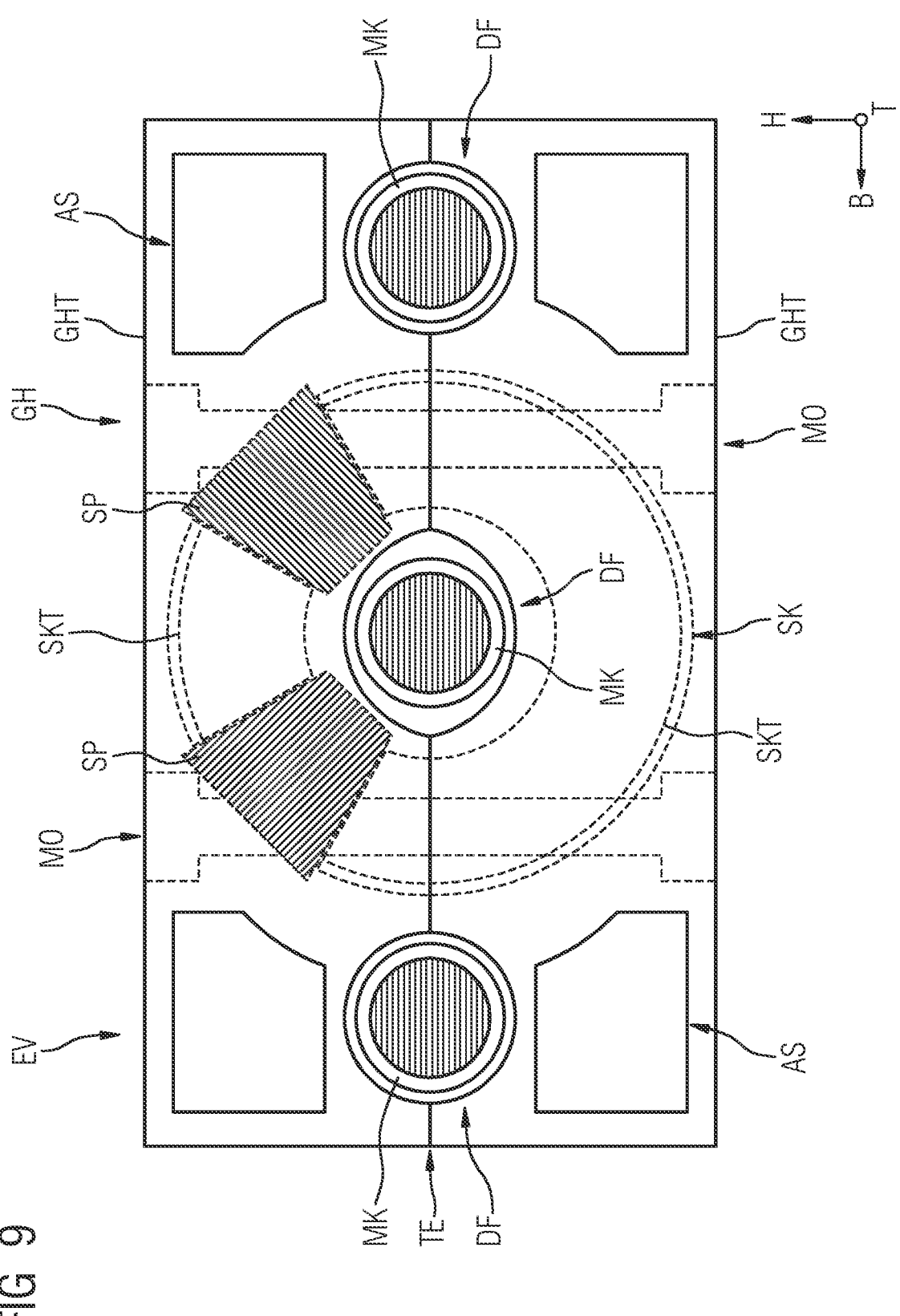
FIG. 9 is a front view of a second example of the device according to the invention.
Figure 10:
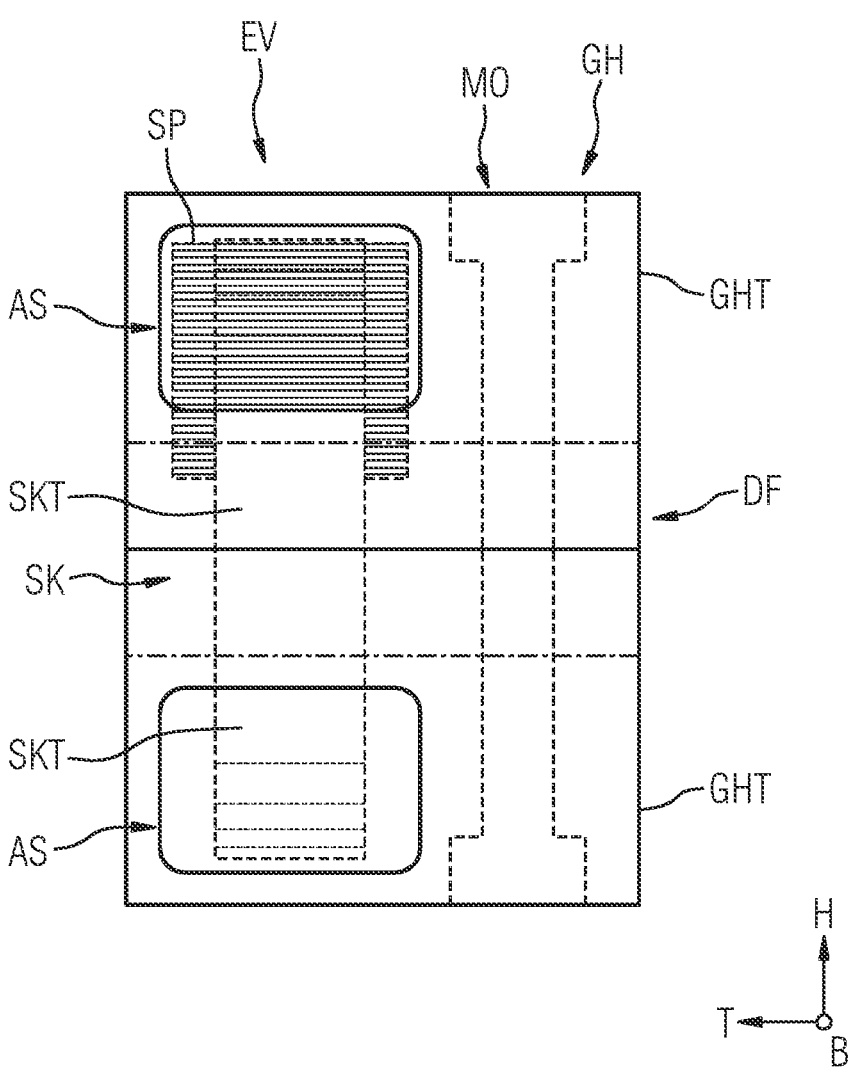
FIG. 10 is a side view of the device of the second example.

FIGS. 9 and 10 schematically show the structure of the energy supply device EV according to a second example in a front view and side view, respectively. In contrast to the first example of FIGS. 6 to 8, only the coil core SK and two coils SP wound around the upper coil core part SKT are arranged in the housing GH, while it is alternatively also possible for just one coil to be wound around the coil core. The two coils SP are furthermore arranged at an angle to the direction of the height H or width B, thereby enabling the headroom of the housing GH or the housing half GHT in which the coils SP are arranged to be reduced. Starting from the coils SP, electrical leads or an electric cable (not shown specifically) are brought out from the housing GH and routed to a further housing in which the above-described further components of the energy supply device EV are arranged, the further housing being for example a housing of the sensor arrangement SE according to FIG. 5.

As well as providing the coil core SK with a fixed position in its arrangement on one motor cable MK and also assuring its mechanical protection, the housing GH further serves for jointly routing or securing the two further motor cables MK. Accordingly, this part of the energy supply device EV comes very close to the basic function of a retaining or block clamp for routing and/or securing motor cables MK and their dimensions.

The housing GH according to the second example consists in turn of two matable housing halves GHT which enclose the three motor cables MK in a respective feedthrough DF over a partial length corresponding to the depth T of the housing GH. The central feedthrough DF results in this example from a respective arc-shaped or elliptical groove on the undersides of the two housing halves GHT. The undersides in this case are preferably each embodied as closed or interrupted only by assembly openings MO. The front faces and lateral faces of the housing halves GHT, in contrast, have by way of example cutouts AS, which extend in line with the feedthrough DF over the entire depth T or width B such that the interiors of the housing halves GHT are in each case not completely closed. In the same way, corresponding cutouts can also be provided in the region of the top sides of the housing halves GHT. The housing GH is thus embodied in the manner of a cage which is arranged around the coil core SK with coils SP and a partial length of the motor cable or motor cables MK.

Such an in particular lighter, open or cage-like configuration of the housing GH is made possible by arranging the further electronic components of the energy supply device EV, which are more sensitive to environmental influences, in another remotely arranged housing for example according to FIG. 4 or 5. The housing GH therefore serves exclusively for securing or routing motor cables MK in a similar manner to a known retaining or block clamp, as well as additionally for mounting coil core SK and coils SP in a fixed position and providing them with a mechanical protection against environmental influences. In this case the coil core SK and the one or more coils SP should preferably be encapsulated in order to ensure additional protection of the electrical components against in particular dust and humidity.

The following is a summary list of reference numerals and the corresponding structure used in the above description of the invention:

AS Cutout
B Width
BU Socket
DF Feedthrough
DGR Bogie frame
DL Cover
DS Storage device
DZ Rotational speed measuring device
ES Energy storage device
ESA Energy storage arrangement
EV Energy supply device
EW Tail car
FR Direction of travel
G Transmission
GH Housing
GHT Housing part
GR Rectifier
H Height
HT Retainer
IB1, IB2 Interior section
K Coupling
KOM Communication device
LDG Trailer bogie
LP Printed circuit board
LT Longitudinal side member
M Motor
MA Motor terminals
MK Motor cable
MO Assembly opening
MW Intermediate car
OE Opening
PAN Pantograph
QT Crossmember
R Wheel
RS Wheelset
RSL Wheelset bearing
RSW Wheelset axle
SE Sensor arrangement
SEN Sensor
SIG Current signature detection device
SK Coil core
SKT Coil core part
SP Coil
ST Control device
SW1-SW4 Voltage converter
T Depth
TDG Motor bogie
TE Parting plane
TF Transformer
TZ Multiple unit trainset
VA Processing device
WK Car body
WKA Car body terminals
WR Inverter
ZK DC intermediate circuit
ZKE DC intermediate circuit

The invention claimed is:

1. A device for supplying energy to a sensor arrangement in a rail vehicle, the device comprising:
   at least one coil;
   a motor cable, said at least one coil being inductively coupled to said motor cable carrying an alternating current;

an annular coil core, said at least one coil being wound around said annular coil core which surrounds said motor cable concentrically or substantially concentrically;

a housing in which said at least one coil is disposed, wherein said housing is embodied to enclose a partial length of said motor cable, said housing having multiple housing parts including at least one first housing part and at least one second housing part;

at least one first voltage converter having an input side and an output side;

at least one DC intermediate circuit having at least one DC link capacitor, wherein said at least one first voltage converter is connected to said at least one coil on said input side and to said at least one DC intermediate circuit on said output side, wherein said first voltage converter is embodied to convert an alternating voltage of said at least one coil into a direct-current voltage of said at least DC intermediate circuit; and at least one second voltage converter having an input side and an output side, wherein said at least one second voltage converter, said at least one first voltage converter and said at least one DC intermediate circuit are disposed in at least one of said housing parts or in a further housing, wherein said at least one second voltage converter is connected to said at least one DC intermediate circuit on said input side and to the sensor arrangement on said output side, and wherein said at least one second voltage converter is embodied to convert a direct-current voltage of said at least one DC intermediate circuit into a feeder direct-current voltage;

said annular coil core having multiple parts including at least one first coil core part disposed in said at least one first housing part and at least one second coil core part disposed in said second housing part; and said housing configured to mechanically secure said motor cable to a component of the rail vehicle and/or to mechanically connect said motor cable to at least one further motor cable.

2. The device according to claim 1, wherein a housing part of said housing parts in which said at least one coil is disposed is accessible via at least one closable opening on a top side and/or on a front face of said housing part.

3. The device according to claim 1, wherein said at least one coil is one of at least two coils disposed in said housing, wherein said at least two coils are wound around a same coil core part or around different coil core parts of said annular coil core.

4. The device according to claim 1, further comprising:

at least one energy storage configuration;

at least one third voltage converter having an input side and an output side, said at least one third voltage converter is connected to said at least one DC intermediate circuit on said input side and to said energy storage configuration on said output side, and wherein said at least one third voltage converter is embodied to convert the direct-current voltage of said at least one DC intermediate circuit into a charging direct-current voltage for said energy storage configuration; and at least one fourth voltage converter having an input side and an output side, said at least one first voltage converter, said at least one DC intermediate circuit, said at least one second voltage converter, said at least one third voltage converter, said at least one energy storage configuration and said at least one fourth voltage converter are disposed in at least one of said housing parts of said housing or in a further housing, wherein said at least one fourth voltage converter is connected to said energy storage configuration on said input side and to the sensor arrangement on said output side, and wherein said at least one fourth voltage converter is embodied to convert a direct-current voltage of said energy storage configuration into the feeder direct-current voltage.

5. The device according to claim 1, further comprising an apparatus for measuring a rotational speed and/or an apparatus for detecting a current signature, which are connected to said at least one coil, and are disposed in at least a housing part of said housing parts in which said at least one coil is disposed.

6. A device for supplying energy to a sensor arrangement in a rail vehicle, the device comprising:

at least one coil;

a motor cable, said at least one coil being inductively coupled to said motor cable carrying an alternating current;

an annular coil core, said at least one coil being wound around said annular coil core which surrounds said motor cable concentrically or substantially concentrically;

a housing in which said at least one coil is disposed, wherein said housing is embodied to enclose a partial length of said motor cable, said housing having multiple housing parts including at least one first housing part and at least one second housing part;

said annular coil core having multiple parts including at least one first coil core part disposed in said at least one first housing part and at least one second coil core part disposed in said second housing part;

said housing configured to mechanically secure said motor cable to a component of the rail vehicle and/or to mechanically connect said motor cable to at least one further motor cable;

at least one first voltage converter having an input side and an output side;

at least one DC intermediate circuit having at least one DC link capacitor, wherein said at least one first voltage converter is connected to said at least one coil on said input side and to said at least one DC intermediate circuit on said output side, wherein said at least one first voltage converter is embodied to convert an alternating voltage of said at least one coil into a direct-current voltage of said at least one DC intermediate circuit;

at least one energy storage configuration;

at least one third voltage converter having an input side and an output side, wherein said at least one third voltage converter is connected to said at least one DC intermediate circuit on said input side and to said at least one energy storage configuration on said output side, wherein said at least one third voltage converter is embodied to convert the direct-current voltage of said at least one DC intermediate circuit into a charging direct-current voltage for said at least one energy storage configuration; and at least one fourth voltage converter having an input side and an output side, said at least one fourth voltage converter, said at least one energy storage configuration, said at least one third voltage converter, said at least one DC intermediate circuit and said at least one first voltage converter are disposed in at least one of said housing parts of said housing or in a further housing, wherein said at least one fourth voltage converter is connected to said at least one energy storage configuration on said input side and to the sensor arrangement on said output side, and wherein said at least one fourth voltage converter is embodied to convert a direct-current voltage of said at least one energy storage configuration into a feeder direct-current voltage.

7. The device according to claim 6, wherein a housing part of said housing parts in which said at least one coil is disposed is accessible via at least one closable opening on a top side and/or on a front face of said housing part.

8. The device according to claim 6, wherein said at least one coil is one of at least two coils disposed in said housing, wherein said at least two coils are wound around a same coil core part or around different coil core parts of said annular coil core.

9. The device according to claim 6, further comprising at least one second voltage converter having an input side and an output side, wherein said at least one second voltage converter is connected to said at least one DC intermediate circuit on said input side and to the sensor arrangement on said output side, wherein said at least one second voltage converter is embodied to convert the direct-current voltage of said at least one DC intermediate circuit into a feeder direct-current voltage.

10. The device according to claim 6, further comprising an apparatus for measuring a rotational speed and/or an apparatus for detecting a current signature, which are connected to said at least one coil, and are disposed in at least a housing part of said housing parts in which said at least one coil is disposed.

11. A rail vehicle, comprising:

at least one traction device having a plurality of motor cables, at least one traction motor, a current converter feeding said at least one traction motor, said current converter and said at least one traction motor are connected by means of said plurality of motor cables;

at least one sensor arrangement having a number of sensors, said sensors serving for detecting a condition of at least one component of the rail vehicle;

the device according to claim 1 for supplying said at least one sensor arrangement with electrical energy;

a bogie;

a car body, wherein the component to which said housing of said device can be fixed is said traction motor, said bogie or said car body of the rail vehicle.

* * * * *